United States Patent [19]

Holz

[11] 4,382,494
[45] May 10, 1983

[54] ADJUSTER STRUT FOR VEHICLE DRUM BRAKE

[75] Inventor: Dietrich Holz, Lahnstein, Fed. Rep. of Germany

[73] Assignee: Lucas Industries Limited, Birmingham, England

[21] Appl. No.: 216,847

[22] Filed: Dec. 16, 1980

[30] Foreign Application Priority Data

Dec. 20, 1980 [GB] United Kingdom ............... 7943831

[51] Int. Cl.³ .......................................... F16D 65/56
[52] U.S. Cl. ...................... 188/79.5 P; 188/196 BA
[58] Field of Search .................. 188/79.5 K, 79.5 P, 188/5 C, 196 BA

[56] References Cited

U.S. PATENT DOCUMENTS

| 1,862,278 | 6/1932 | Parker | 188/79.5 SC |
| 1,865,524 | 7/1932 | La Brie | 188/79.5 SC |
| 2,051,867 | 8/1936 | La Brie | 188/79.5 SC |
| 2,060,885 | 11/1936 | McConkey | 188/79.5 SC |
| 3,166,160 | 1/1965 | Burnett | 188/79.5 SC |
| 3,220,516 | 11/1965 | Swift | 188/196 BA |
| 3,905,456 | 9/1975 | Torii et al. | 188/79.5 P |
| 3,963,100 | 6/1976 | Kaub | 188/79.5 P |

Primary Examiner—Duane A. Reger
Attorney, Agent, or Firm—Scrivener, Clarke, Scrivener and Johnson

[57] ABSTRACT

An adjuster strut for a vehicle drum brake comprises a non-rotatable bar abutting one of the brake shoes, and internally screw-threaded barrel non-rotatably mounted on the bar, a screw-threaded rod screwed into the barrel and being fast with a ratchet wheel, the wheel being arranged to be rotated by a pawl in the event of excess shoe travel, such rotation of the wheel screwing the rod out of the barrel to increase the strut length, and an abutment member which abuts the other shoe and on which the ratchet wheel is rotatably mounted. In order to ensure that the strut is clear of a wheel hub even in the worn condition of the brake shoes, the bar extends over the major part of the length of the strut and is flat.

2 Claims, 3 Drawing Figures

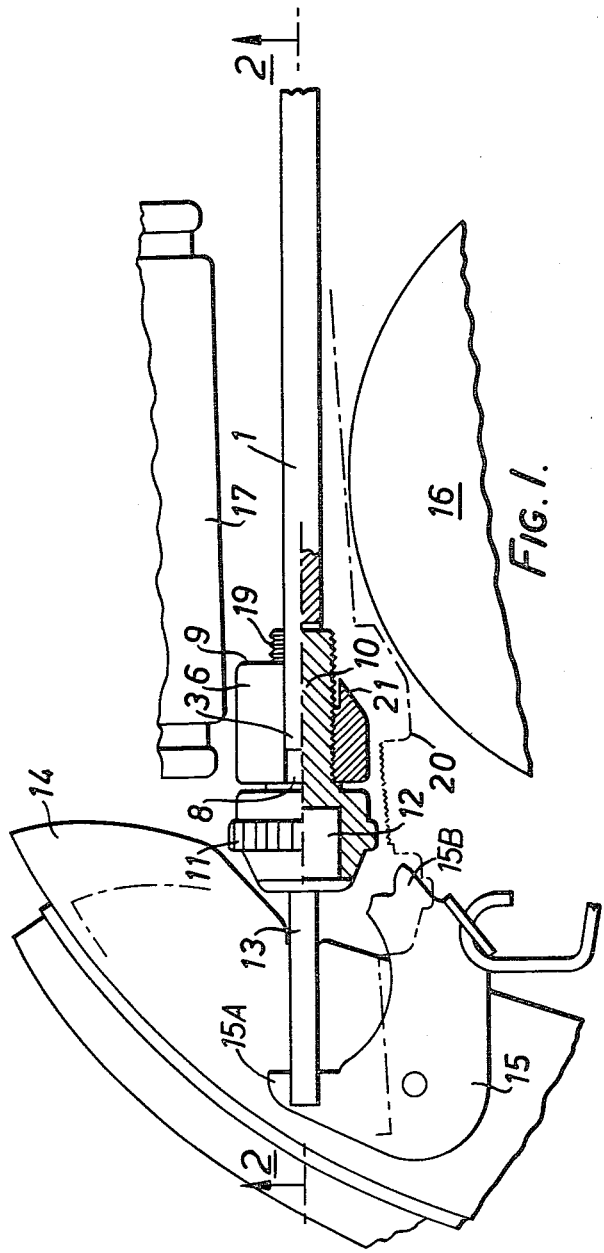
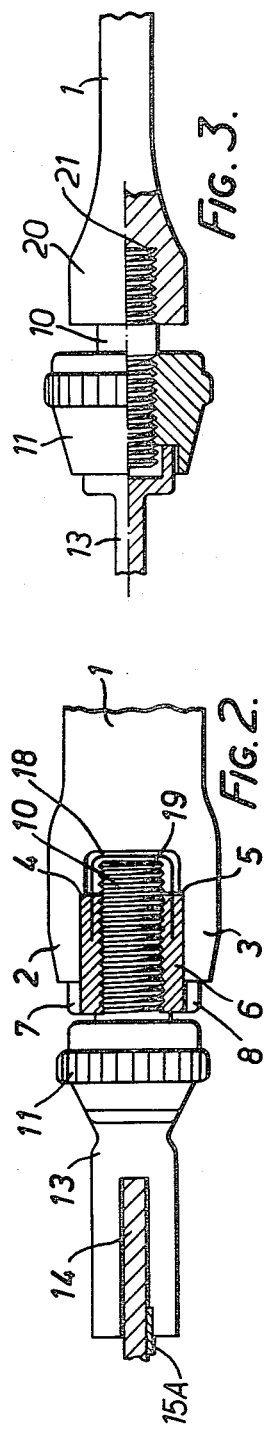

ADJUSTER STRUT FOR VEHICLE DRUM BRAKE

This invention relates to adjuster struts for vehicle drum brakes.

Such struts are of a variable length and are arranged between the brake shoes. A known strut includes a threaded rod and a complementary nut, the nut being wound along the rod by the action of a pawl which turns the nut when the travel of the shoes becomes excessive.

Such a strut usually has to be placed alongside a hydraulic actuating cylinder of the brake. If the axle hub that passes through the centre of the brake is large, then the space available for the strut, between the hub and the cylinder, can be very restricted. A strut that is curved or kinked, to clear the hub, would not be rigid enough.

In our U.K. patent specification Nos. 1402527 and 1460847 there are shown examples of such known adjuster struts. In each case, the mechanical brake actuation forces are transmitted along the strut by a hollow barrel, in abutment with the nut. A length of the threaded rod is contained within the hollow interior of the nut. Thus the diameter of the barrel is determined by the diameter of the rod. Also, the largest diameter part of the adjuster, i.e. the ratchet teeth on the nut, moves towards the centre of the brake as the shoes wear. For both these reasons, such an arrangement can be impossible to accommodate with an unusually large hub.

In our U.K. patent specification No. 1425383, there is described a strut in which the forces are transmitted through a flat bar, rather than a hollow barrel, and the ratchet teeth remain well over to one end of the strut. Thus, a larger hub can be accommodated with little difficulty. However, the length of the threaded rod is contained within a cut-out in the web of the shoe, which can weaken the shoe, and furthermore, that part of the thread which enters the nut during adjustment is exposed, whereas, with the barrel arrangement, that part of the thread is protected by being inside the barrel.

The invention is aimed at combining the strength and reliability advantages of the kind of strut having a barrel, and the space-saving advantages of the kind of strut having a flat-bar.

In accordance with the invention, there is provided an adjuster strut for a vehicle drum brake comprising a non-rotatable generally flat element extending over the major part of the length of the strut and abutting one of the brake shoes, an abutment member which abuts the other shoe and on which a ratchet wheel is rotatably mounted, said wheel being arranged to be rotated by a pawl in the event of excess shoe travel, and a screw-threaded connection between the flat element and the ratchet wheel, whereby rotation of the wheel in response to excess shoe wear increases the strut length.

In the fully worn condition of the brake shoes the strut is clear of the wheel hub. To permit greater travel of the strut towards the hub, the enlarged portion of the flat element may be cut away locally, without affecting its strength unduly, to clear the hub.

The element preferably comprises a flat member and a separate screw-threaded member which forms the enlarged portion. The flat member may be bifurcated at the end on which the screw-theaded member is mounted, the arms of the bifurcated end being in engagement with grooves formed in the side of the screw-threaded member, and the arms being stepped to abut the end of the screw-threaded member.

It is convenient to form the screw-thread right through the screw-threaded member, and for the end of a threaded rod to protrude therefrom at least in one extreme lining wear condition. The exposed rod end may then be protected by a simply fitted cap, for example, of plastics, that may be thin enough not to interfere with the space envelope required by the strut. The exposed end of the rod, whether or not protected by the cap, may be accommodated between the arms of the bifurcated end of the flat member.

An adjuster for vehicle drum brakes having an adjuster strut in accordance with the invention, and a modification thereof, will now be described, by way of example, with reference to the accompanying drawings, in which:

FIG. 1 is a part-sectional elevational view of part of a drum brake incorporating the adjuster, FIG. 2 is a part-sectional view taken along line 2—2 of FIG. 1 and, FIG. 3 is a part-sectional detail view, similar to FIG. 2, illustrating the modification.

Referring to FIGS. 1 and 2, the adjustable strut of the adjuster extends between two shoes 14, only one of which is shown, in known manner.

The strut comprises a flat bar 1 one end of which abuts the non-illustrated shoe for movement therewith. At its other end the bar 1 is bifurcated to form arms 2,3 having respective steps or shoulders 4,5. The arms 2,3 extend into respective aligned grooves 7,8 formed axially in the outer surface of a short cylindrical barrel 6, the barrel being located axially by the engagement of its inner end 9 with the shoulders 4,5 of the bar 1. Thus, the barrel 6 is non-rotatably mounted on the bar 1. The arms 2,3 are inherently slightly resilient and are preferably an interference fit in the grooves 7,8 to hold the barrel during fitment of the strut to the brake and to prevent rattle-producing vibrations in service. The strut is so arranged that it is never subjected to tensile loads, so that the grip of the arms 2,3 on the barrel 6 need not be substantial.

Extending completely through the barrel 6 and protruding into the space between arms 2,3 is a female thread into which is screwed a threaded rod 10 which is integral with a ratchet wheel 11 having circumferentially arranged teeth. A thin, plastic cap 18, shown in FIG. 2 but not in FIG. 1, protects the exposed end 19 of the rod 10. The outer, left-hand end of the ratchet wheel 11 has a blind bore which receives a spigot end 12 formed on a bifurcated abutment member 13 engaging the left hand shoe 14.

A pawl lever 15, in the form of a bell-crank lever, is pivotally mounted on the left hand shoe and has one arm 15A engaging the abutment member 13, as best seen in FIG. 2, and the other arm 15B having a pawl (omitted from the drawings for clarity) engaging the ratchet wheel 11. The pawl lever 15 operates in known manner.

As seen in FIG. 1, the space available for the adjuster is determined by the locations of an axle hub 16 and a hydraulic actuating cylinder 17.

Operation of the adjuster need be only briefly described. When the brake linings are new and unworn, the adjuster adopts the position shown in full lines in FIG. 1. As the linings wear, the pawl lever 15 rotates the ratchet wheel 11, and thus the rod 10, to withdraw the rod 10 from the barrel 6. In this way, the overall length of the strut is gradually increased during the life of the shoe linings. When the linings are fully worn, the strut is in the position shown in broken lines in FIG. 2. In that position the ratchet wheel is well clear of the hub and the part of the strut closest to the hub is bar 1. In order to ensure that the barrel 6 does not engage the hub, an edge 21 is cut away, or levelled.

In the modification illustrated in FIG. 3, parts corresponding to those of FIG. 1 have been given the same reference numerals. The main difference of the modification is that the barrel 6 is integral with the bar 1 and formed as an enlarged head of the bar, for example, by casting or forging. In this modification the head 20 has a blind bore 21 which non-rotatably receives the screw-threaded end of the rod 10 so that the rod does not rotate with respect to the head 20. As described above, the rod 10 is in screw-threaded engagement with the ratchet wheel 11 which is rotatably mounted on the abutment member 13. When the adjuster is operated, ratchet wheel 11 is rotated relative to the rod 10 and moves leftwardly along the rod to lengthen the strut.

As an alternative, the rod 10 could be integral with ratchet wheel 11, or non-rotatably received in the wheel, in which case the rod would be rotatably received in the bore 21.

In each of the above-described struts, because the ratchet wheel does not move through to full wear travel with respect to the left-hand shoe, the pawl-to-teeth engagement does not have to cater for that travel and hence the pawl and the teeth can be quite narrow.

I claim:
1. In a vehicle wheel drum brake having a pair of shoes, a hydraulic actuating cylinder operable on adjacent ends of said shoes and a wheel hub in relatively closely spaced adjacency to said actuator, the improvement comprising an adjuster strut comprised of a generally flat element extending over the major portion of the length of the strut and located between said wheel hub and said actuating cylinder, said element abutting one of said shoes and having an enlarged end portion remote from said one shoe, said enlarged end portion being at all times wholly disposed to the side of the axis of said hub as the other of said shoes, an abutment member abutting said other of said shoes, a ratchet wheel having an axial recess therein for rotatably receiving a projection on said abutment member whereby said ratchet wheel surrounds and abuttingly engages portions of said abutment member, a pawl pivotally mounted on said other of said shoes and arranged to rotate said wheel in the event of excess shoe travel, and a screw threaded rod having a non-rotatable screw threaded connection with the enlarged end portion of said flat element and a rotatable screw threaded connection with said ratchet wheel whereby rotation of said wheel along said rod and against said abutment member in response to excess shoe wear increases the strut length.

2. A strut according to claim 1, wherein said enlarged portion of said flat element has a portion cut away to avoid engagement of that element with said wheel hub.

* * * * *